US012756971B2

(12) United States Patent
Gong et al.

(10) Patent No.: US 12,756,971 B2
(45) Date of Patent: Oct. 6, 2026

(54) ELECTRONIC DEVICE

(71) Applicant: Lenovo (Beijing) Limited, Beijing (CN)

(72) Inventors: Yongyan Gong, Beijing (CN); Chun Ren, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 121 days.

(21) Appl. No.: 18/803,156

(22) Filed: Aug. 13, 2024

(65) Prior Publication Data

US 2025/0063294 A1 Feb. 20, 2025

(30) Foreign Application Priority Data

Aug. 15, 2023 (CN) ......................... 202311027484.4

(51) Int. Cl.
*H04R 1/24* (2006.01)
*H04R 1/02* (2006.01)
*H04R 1/28* (2006.01)

(52) U.S. Cl.
CPC ........... *H04R 1/2857* (2013.01); *H04R 1/025* (2013.01); *H04R 1/24* (2013.01); *H04R 2499/11* (2013.01); *H04R 2499/15* (2013.01)

(58) Field of Classification Search
CPC ........ H04R 1/2857; H04R 1/025; H04R 1/24; H04R 2499/11; H04R 2499/15
See application file for complete search history.

(56) References Cited

U.S. PATENT DOCUMENTS 5,524,062 A * 6/1996 Oh ........................ H04R 1/2842 381/338
5,821,471 A * 10/1998 McCuller ............. H04R 1/2857 181/156
2002/0085731 A1* 7/2002 Aylward .............. H04R 1/2857 381/349
2007/0284184 A1* 12/2007 Krueger ............... H04R 1/2857 181/151

* cited by examiner

*Primary Examiner* — Suhan Ni
(74) *Attorney, Agent, or Firm* — ANOVA LAW GROUP, PLLC

(57) ABSTRACT

An electronic device includes a first speaker and a sound guiding component. The first speaker is in communication with the sound guiding component. The sound guiding component is configured to receive a sound wave generated by a vibration of the first speaker, form a sound signal based on the sound wave, and then output the sound signal to a user end to improve a frequency response capability of the first speaker.

11 Claims, 4 Drawing Sheets

ELECTRONIC DEVICE

CROSS-REFERENCE TO RELATED APPLICATION

The present disclosure claims priority to Chinese Patent Application No. 202311027484.4, filed on Aug. 15, 2023, the entire content of which is incorporated herein by reference.

TECHNICAL FIELD

The present disclosure relates to the electronic technology field and, more particularly, to an electronic device.

BACKGROUND

Currently, due to the limitation of space inside an electronic device, the sound of a speaker at a certain bandwidth has a significant loss. Thus, the frequency response capability of the speaker is impaired.

SUMMARY

The present disclosure provides an electronic device including a first speaker and a sound guiding component. The first speaker is in communication with the sound guiding component. The sound guiding component is configured to receive a sound wave generated by a vibration of the first speaker, form a sound signal based on the sound wave, and then output the sound signal to a user end to improve a frequency response capability of the first speaker.

DETAILED DESCRIPTION OF THE EMBODIMENTS

The technical solutions of embodiments of the present disclosure are described in detail in connection with the accompanying drawings of embodiments of the present disclosure. Obviously, described embodiments are merely some embodiments of the present disclosure, not all embodiments. Based on embodiments of the present disclosure, all other embodiments obtained by those ordinary skills in the art without any creative effort are within the scope of the present disclosure.

Currently, speakers can emit front sound waves and back sound waves based on the vibration of internal vibration assemblies of the speakers. The back sound waves and the front sound waves can cancel each other out due to opposite phases. Thus, most low-frequency sounds are inaudible with a significant sound loss. The existing solution is that a box body is connected to the back of a speaker to form a speaker module. Then, the cancellation of the front sound waves and the back sound waves can be effectively reduced. However, with different sizes of the box body, the low-frequency response capability of the speaker module can be affected. Moreover, due to the limitation of the size of the space in the electronic device, the box body connected to the speaker can be relatively small. Thus, the frequency response capability of the speaker can be lowered.

Figure 1:
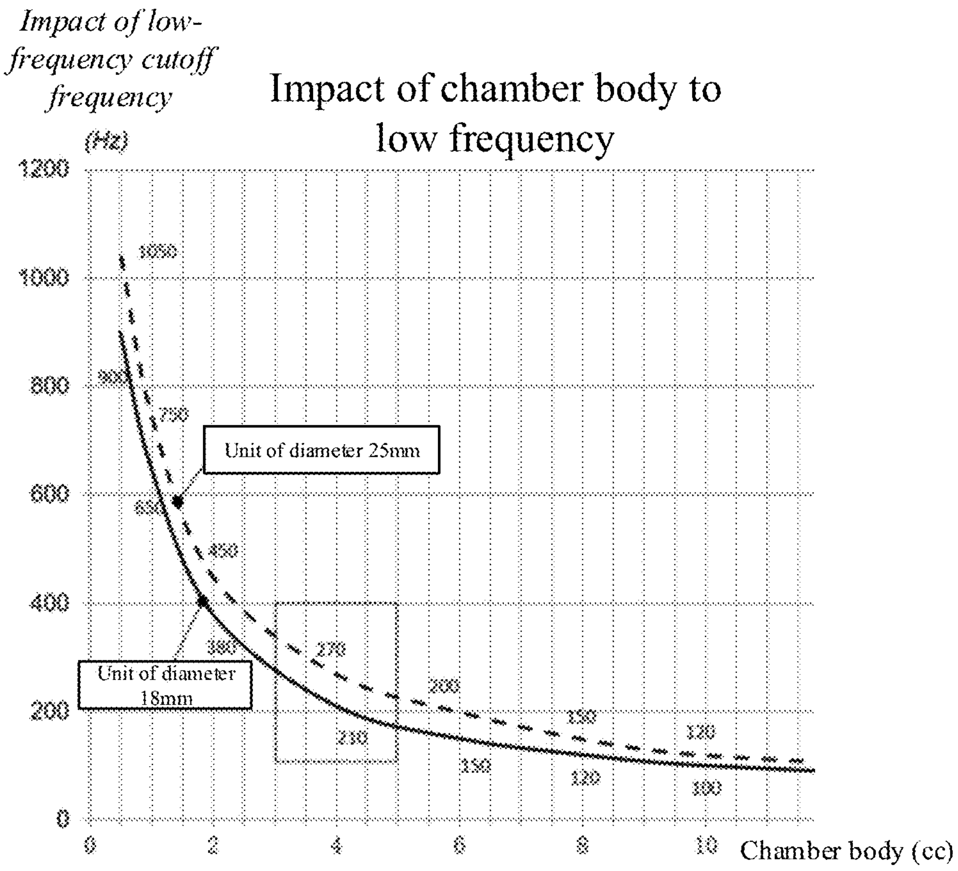
FIG. 1 illustrates a schematic diagram showing amplitude of an impact of a chamber body to a low frequency part of a sound wave generated by a speaker when different speakers communicate with different chamber bodies according to some embodiments of the present disclosure.

FIG. 1 illustrates a schematic diagram showing amplitude of an impact of a chamber body to a low frequency part of a sound wave generated by a speaker when different speakers communicate with different chamber bodies according to some embodiments of the present disclosure. A dashed line in FIG. 1 represents the impact amplitude of the low-frequency cut-off frequency of different speaker modules formed by connecting a 25 mm diameter speaker with different sizes of box bodies compared to the low-frequency cut-off frequency of the speaker. A solid line in FIG. 1 represents the impact amplitude of the low-frequency cut-off frequency of different speaker modules formed by connecting an 18 mm diameter speaker with different sizes of box bodies compared to the low-frequency cut-off frequency of the speaker. The horizontal axis in FIG. 1 represents sizes of different box bodies in cubic centimeters (cc), and the vertical axis represents the impact amplitude of the low-frequency cut-off frequency of the speaker module relative to the low-frequency cut-off frequency of the speaker in Hertz (Hz), i.e., the amount of low-frequency loss of the back sound waves generated by the speaker in the box body connected to the speaker.

Based on FIG. 1, the box bodies with different sizes connected to the speaker have different low-frequency response capabilities for the sound waves generated by the speaker. The frame in FIG. 1 indicates that the low-frequency cut-off frequencies of two corresponding speaker modules are increased by 270 Hz and 210 Hz, respectively, when the 25 mm diameter speaker and the 18 mm diameter speaker are connected to a 4 cc box body. That is, after the two speakers are connected to the 4 cc box body, the sound wave losses corresponding to the low-frequency parts of the back sound waves lose 270 Hz and 210 Hz, respectively. As shown in FIG. 1, when the box body connected to the speaker is larger, the impact amplitude of the low-frequency cut-off frequency of the speaker module relative to the low-frequency cut-off frequency of the speaker can be smaller. However, in the existing electronic device, due to the limitation of space, the size of the box body connected to the speaker is limited. Thus, the low-frequency response capability of the speaker of the electronic device can be low.

For example, when the box body connected to the speaker is configured in a computer, due to the limited space of the computer, the volume of the box body can be small. Thus, the low-frequency response capability of the speaker in the computer can be low.

Based on the above, the present disclosure provides an electronic device. The electronic device can include a sound guiding component. A first speaker can be connected to the sound guiding component. The sound wave generated by the first speaker can be formed into a sound signal by the sound guiding component and output to a user end to effectively increase the frequency response capability of the first speaker.

To make the objectives, features, and advantages of the present disclosure clearer, the present disclosure is further described in detail in connection with the accompanying drawings and embodiments of the present disclosure.

Figure 2:
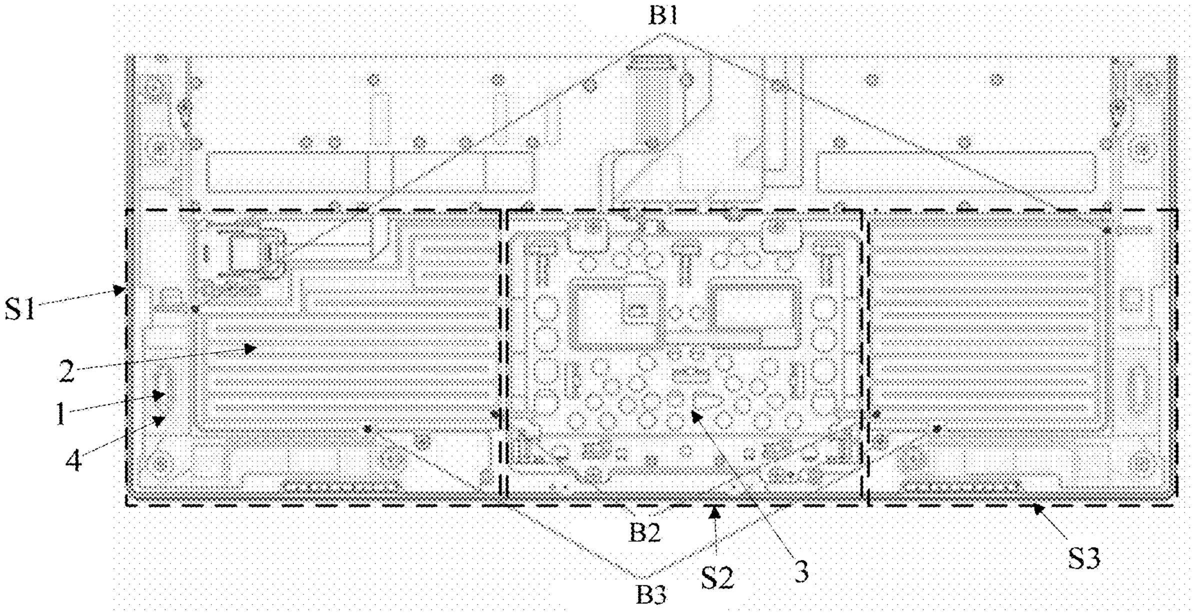
FIG. 2 illustrates a schematic structural diagram of an electronic device according to some embodiments of the present disclosure.

FIG. 2 illustrates a schematic structural diagram of an electronic device according to some embodiments of the present disclosure. The electronic device includes a first speaker 1 and a sound guiding component 2.

The first speaker 1 is connected to the sound guiding component 2. The sound guiding component 2 can be configured to receive the sound wave generated by the vibration of the first speaker 1, form a sound signal based on the sound wave, and output the sound signal to the user end to improve the frequency response capability of the first speaker 1.

The electronic device of embodiments of the present disclosure includes the sound guiding component 2. The first speaker 1 is connected to the sound guiding component 2. Thus, the sound wave generated by the first speaker 1 can be formed into the sound signal through the sound guiding component 2 and output to the user end, thereby effectively improving the frequency response capability of the first speaker 1.

As shown in FIG. 2, in some embodiments, the electronic device can include a laptop, a tablet, a cellphone, etc. The electronic device can display data and perform data communication. The electronic device of embodiments of the present disclosure can include a first body and a second body. The first body and the second body can be rotatably connected based on an axis. The first speaker 1 and the sound guiding component 2 can be arranged in the second body. The sound guiding component 2 can include a channel for transmitting sound waves. The sound guiding component 2 can transmit the sound signal to the user end based on the channel. The air inside the sound guiding component 2 can flow based on the channel to balance air pressure. In a direction parallel to the axis, the second body can include a touch assembly 3, the first speaker 1, and the sound guiding component 2. The sound guiding component 2 can be arranged between the first speaker 1 and the touch assembly 3. The orientation of the sound guiding component 2 can be determined based on the area size and shape of an empty area between the first speaker 1 and the touch assembly 3 and the length of the required sound guiding component 2. With different orientations of the sound guiding component 2, the increment of the frequency response capability of the first speaker 1 can be different. When the sound wave of the first speaker 1 passes through the sound guiding component 2, the sound wave can have a certain energy attenuation. Moreover, when the sound wave passes through the sound guiding component 2, the phase of the sound wave can change. Thus, the frequency response capability of the first speaker can be increased, or the frequency response capability of the first speaker 1 can be increased by forming a certain frequency resonance based on the airflow in the channel. The size of the phase of the sound wave changed by the sound guiding component 2 can be related to the length of the sound guiding component 2. In some embodiments, the low-frequency part of the first speaker can at least be improved by 3 decibels by transmitting the sound wave based on the sound guiding component, and the space inside the electronic device may not need to be increased.

Figure 3:
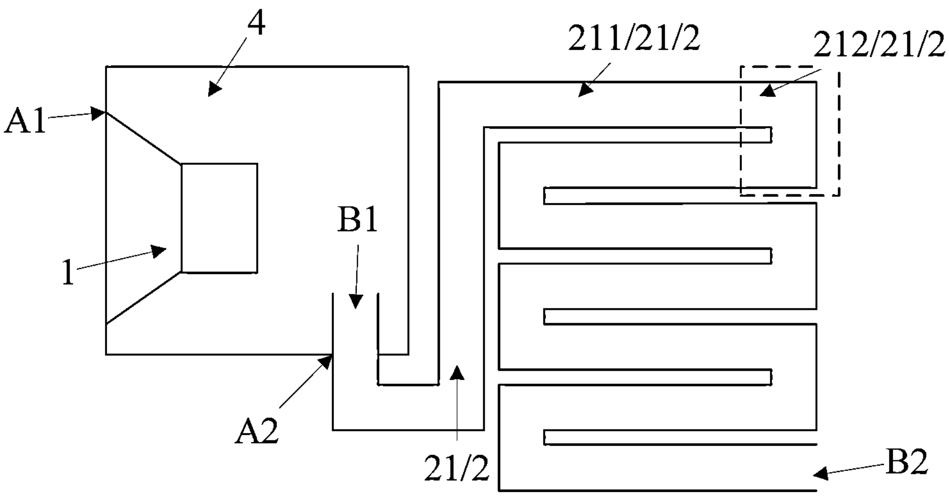
FIG. 3 illustrates a schematic diagram showing a communication between a first speaker and a sound guiding component according to some embodiments of the present disclosure.

FIG. 3 illustrates a schematic diagram showing a connection between a first speaker and a sound guiding component according to some embodiments of the present disclosure. The electronic device of embodiments of the present disclosure in FIG. 3 includes a chamber body 4. The chamber body 4 includes a first opening A1 and a second opening A2. The sound guiding component 2 includes a first end B1 and a second end B2.

The first speaker 1 communicates with the chamber body 4 through the first opening A1.

The first end B1 communicates with the chamber body 4 based on the second opening A2 and is configured to receive the sound wave generated by the vibration of the first speaker 1. The second end B2 is configured to output the sound signal.

As shown in FIG. 2 and FIG. 3, in the electronic device of embodiments of the present disclosure, the second body includes the chamber body 4. The first speaker 1 communicates with the sound guiding component 2 based on the chamber body 4 of the electronic device. The chamber body includes the first opening A1 and the second opening A2. The sound guiding component 2 includes the first end B1 and the second end B2. The first speaker 1 communicates with the chamber body 4 through the first opening A1. The first end B1 of the sound guiding component 2 communicates with the chamber body 4 through the second opening A2 to cause the first speaker 1 to communicate with the sound guiding component 2. The second end B2 of the sound guiding component 2 can be configured to output the sound signal formed based on the sound wave input from the first end B1. In a direction perpendicular to the second body, the first speaker 1, the chamber body 4, and the first end B1 of the sound guiding component 2 can overlap. The position of the second end B2 can be determined based on the orientation and length of the sound guiding component 2.

In the electronic device, the vibration of the first speaker 1 can form a first sound wave and a second sound wave. The first sound wave and the second sound wave can have opposite phases. The sound guiding component 2 can receive the first sound wave generated by the first speaker 1 and outputs a sound signal having the same phase as the second sound wave. The frequency response capability of the first speaker 1 can be increased for at least one of the sound guiding components 2 being able to enlarge the frequency range responded by the first speaker, or the sound guiding component 2 being able to increase the signal strength of the first speaker.

In the electronic device of embodiments of the present disclosure, the first speaker 1 can include a vibration assembly and a magnet assembly. The first speaker 1 can form the first sound wave and the second sound wave based on the vibration assembly. The first sound wave and the second sound wave can be opposite. The transmission direction of the first sound wave can be a direction from the vibration assembly to the magnet assembly. The sound guiding component 2 can be configured to receive the first sound wave and output the sound signal having the same phase as the second sound wave. Increasing the frequency response capability of the first speaker 1 based on the sound guiding component 2 can include increasing the strength of a sound wave in a certain frequency range of the frequency range corresponding to the first sound wave by the sound guiding component 2. On one aspect, the sound guiding component 2 increasing the frequency response capability of the first speaker 1 can include increasing the frequency response range of the first speaker 1 based on the sound guiding component 2. That is, if the first speaker 1 can form the sound signal of the second frequency range based on the sound wave generated by the first speaker 1, after the first speaker 1 communicates with the sound guiding component 2, the sound guiding component 2 can form a sound signal having a third frequency range based on the sound wave generated by the first speaker 1. The third frequency range can be greater than the second frequency range. The smallest frequency of the third frequency range can be smaller than the smallest frequency of the second frequency range. On another aspect, the signal strength of the first speaker 1 can be increased based on the sound guiding component 2. Then, the second frequency range can be the same as the third frequency range. The sound signal formed by the sound wave with a certain frequency range in the first sound wave generated by the first speaker 1 can have the first strength. After the first speaker 1 communicates with the sound guiding component 2, the sound wave with the certain frequency range of the first sound wave generated by the first speaker 1 can have the second strength based on the sound signal generated by the sound guiding component 2. The second strength can be greater than the first strength.

In the electronic device, when the electronic device includes a plurality of first speakers 1, at least one first speaker 1 can have a corresponding sound guiding component 2.

In the electronic device, by providing the sound guiding component 2 and connecting the sound guiding component 2 to the first speaker 1 through the chamber body 4, the frequency response capability of the first speaker 1 can be improved. However, when the electronic device includes the plurality of first speakers 1 and the space of the electronic device is small, in some embodiments, only one first speaker 1 can be correspondingly connected to a sound guiding component 2 to improve the frequency response capability of the first speaker 1, thereby enhancing the sound effect of the electronic device. The remaining first speakers 1 of the plurality of first speakers 1 may not be connected to the sound guiding component 2.

As shown in FIG. 2, in the electronic device, when the electronic device includes the plurality of first speakers 1, the plurality of first speakers 1 are connected to a plurality of sound guiding components 2 in a one-to-one correspondence.

If the parameters of the plurality of sound guiding components 2 in one-to-one correspondence with the plurality of first speakers 1 are not the same, the plurality of sound guiding components 2 can have corresponding first frequency ranges, respectively.

As shown in FIG. 2, in some embodiments, when the electronic device of embodiments of the present disclosure includes a plurality of first speakers 1 with the plurality of corresponding sound guiding components 2, the plurality of sound guiding components 2 are connected to the plurality of first speakers 1 in the one-to-one correspondence. The parameters of the plurality of sound guiding components 2 connected to the plurality of first speakers 1 in the one-to-one correspondence can be the same or different, which are determined based on specific embodiments. When the parameters of the plurality of sound guiding components 2 are different, the plurality of sound guiding components 2 can be configured to improve the plurality of first frequency ranges of the sound signals corresponding to the plurality of sound guiding components 2. Moreover, the plurality of first frequency ranges can overlap, not overlap, or partially overlap.

In the structure shown in FIG. 2, the electronic device includes two first speakers 1 and two sound guiding components 2 connecting to the two first speakers 1. In the direction parallel to the axis, the second body includes first area S1, second area S2, and third area S3 arranged in sequence. Second area S2 includes the touch assembly 3. The touch assembly 3 is connected to a touchpad on the outer surface of second area S2. A first speaker 1 and a sound guiding component 2 are arranged in each of first area S1 and second area S2. In first area S1, the sound guiding component 2 can be arranged between the first speaker 1 correspondingly connected and the touch assembly 3. In third area S3, the sound guiding component 2 is arranged between the first speaker 1, that is correspondingly connected, and the touch assembly 3. The parameters of the two sound guiding components 2 can be same or different. The parameters of the sound guiding component 2 can include the length of the sound guiding component 2, the height of the sound guiding component 2 in the direction perpendicular to the second body, the width of the sound guiding component 2 in the arrangement direction of first area S1 and second area S2, and the shape of the cross-section of the sound guiding component 2 in the direction perpendicular to the second body.

In addition, when the electronic device includes the plurality of sound guiding components 2, and the parameters of the plurality of sound guiding components 2 are the same, the lengths, the widths, the heights, and the shapes of the cross-sections of the sound guiding components 2 may need to be the same. When the parameters of the plurality of sound guiding components 2 are different, at least one of the lengths, the widths, the heights, or the shapes of the cross-sections of the sound guiding components 2 can be different. In addition, when the widths, the heights, and the shapes of the cross-sections of the sound guiding components 2 are the same, and the lengths of the sound guiding components 2 are different, the plurality of sound guiding components 2 each can include a plurality of first frequency ranges. The plurality of first frequency ranges can correspondingly include a plurality of smallest frequencies. Absolute values of differences between the plurality of smallest frequencies and the average value of the plurality of smallest frequencies may not exceed 10%. For example, when the plurality of sound guiding components 2 are designed, and the lengths of the plurality of sound guiding components 2 are different, the first frequency ranges that can be enhanced by the sound guiding components 2 can be calculated based on the lengths of the sound guiding components 2. The plurality of first frequency ranges corresponding to the plurality of sound guiding components 2 can be calculated. The plurality of smallest frequencies can be correspondingly obtained. The average value can be calculated based on the plurality of smallest frequencies. Then, the plurality of smallest frequencies can be compared to the average value, when the absolute value of the difference between the smallest frequency and the average value does not exceed 10%, the sound guiding component 2 can meet the requirement. If the absolute value of the difference between the smallest frequency and the average value exceeds 10%, the length of the sound guiding component 2 may need to be adjusted.

As shown in FIG. 2, in some embodiments, the length of the sound guiding component 2 is greater than 1 m. The width of the channel of the sound guiding component 2 is not smaller than 3 mm. In some embodiments, the width can range from 3 mm to 10 mm. The height of the channel of the sound guiding component 2 is not smaller than 2 mm. In some embodiments, the height can range from 2 mm to 6 mm. When the width of the channel of the sound guiding component is smaller than 3 mm and/or the height of the channel of the sound guiding component 2 is smaller than 2 mm, the transmission of the sound signal in the channel of the sound guiding component 2 may not be smooth, which can cause significant attenuation of the sound signal. Thus, the sound guiding component 2 cannot effectively transmit the sound signal.

The electronic device can further include a first housing. The first housing can include a sound output hole configured to transmit the sound signal to the user end. In the extension direction of the sound guiding component 2, the position of the sound output hole at the first housing can correspond to the position of second end B2.

In some embodiments, the electronic device includes a first housing and a second housing. In the direction perpendicular to the second body, the two first speakers 1 and the corresponding sound guiding components 2 can be arranged between the first housing and the second housing. In some embodiments, the second housing can include a sound output hole configured to transmit the sound signal of second end B2 of the sound guiding component 2 to the user end. The position of the sound output hole at the second housing can be determined based on the position of second end B2. In the extension direction of the sound guiding component, the position of the sound output hole can overlap with second end B2. The second housing can include support point B3. The sound guiding component 2 can be fixed at the first housing based on the fixture assembly at support point B3.

As shown in FIG. 3, the sound guiding component 2 includes a sound-guiding tube 21.

The sound-guiding tube 21 includes a plurality of first tubes 211 and bending members 212.

A bending member 212 is configured to connect to two neighboring first tubes 211.

As shown in FIG. 3, the sound guiding component 2 is the sound-guiding tube 21. The sound-guiding tube 21 includes the plurality of first tubes 211 and bending members 212. The first tube 211 is a straight tube. The plurality of first tubes 211 can have the same length or different lengths, which can be determined based on the sound-guiding tube 21. The bending members 21 can be configured to connect the plurality of first tubes 211 to form the sound-guiding tube 21. A number of the first tubes 211 and a number of the bending members 212 can be determined based on the orientation and the length of the sound-guiding tube 21. The sound guiding component 2 can be configured to transmit a sound wave to form a sound signal and transmit the sound signal to the user end. The sound guiding component 2 can select a structure that satisfies the usage of the sound guiding component 2. The sound guiding component 2 can include but is not limited to the sound-guiding tube 21. In some embodiments, the sound guiding component 2 can include another device that satisfies the usage and can be determined based on the requirement of the electronic device. In addition, when the sound-guiding tube 21 is selected as the sound guiding component 2, the cross-section of the sound-guiding tube 21 can include but is not limited to a circle, an oval, a rectangle, or an irregular shape. In some embodiments, the cross-section of the sound-guiding tube 21 can be a rectangle.

In the electronic device, the sound guiding component 2 can be configured to improve the strength of the sound wave corresponding to the first frequency range.

The length of the sound guiding component 2 can be positively correlated to the first frequency range, and/or the length of the sound guiding component 2 can be negatively correlated with the enhancement of the strength of the sound wave corresponding to the first frequency range.

In the electronic device, based on the sound guiding component 2, the strength of the sound wave with a certain frequency range can be enhanced. A certain frequency range can be the first frequency range. The length of the sound guiding component 2 can be negatively related to the enhancement of the strength of the sound wave corresponding to the first frequency range by the sound guiding component 2. That is, when the length of the sound guiding component 2 is longer, the strength of the sound wave corresponding to the first frequency range that can be enhanced can be smaller. The length of the sound guiding component 2 can be positively related to the enhancement of the first frequency range. That is, when the length of the sound guiding component 2 is longer, the range of the first frequency range that can be enhanced by the sound guiding component 2 can be larger. When the length of the sound guiding component 2 is longer, the first frequency range is larger, and the strength of the first frequency range improved by the sound guiding component 2 is smaller. Thus, the length of the sound guiding component 2 can be set based on the needs of embodiments of the present disclosure. In some embodiments, to cause the length of the sound guiding component 2 to enlarge the first frequency range and improve the strength of the sound wave corresponding to the first frequency range, the first frequency range can be set to range from 100 Hz to 200 Hz. The length of the sound guiding component 2 can be set to 0.85 m to 1.7 m.

Figure 4:
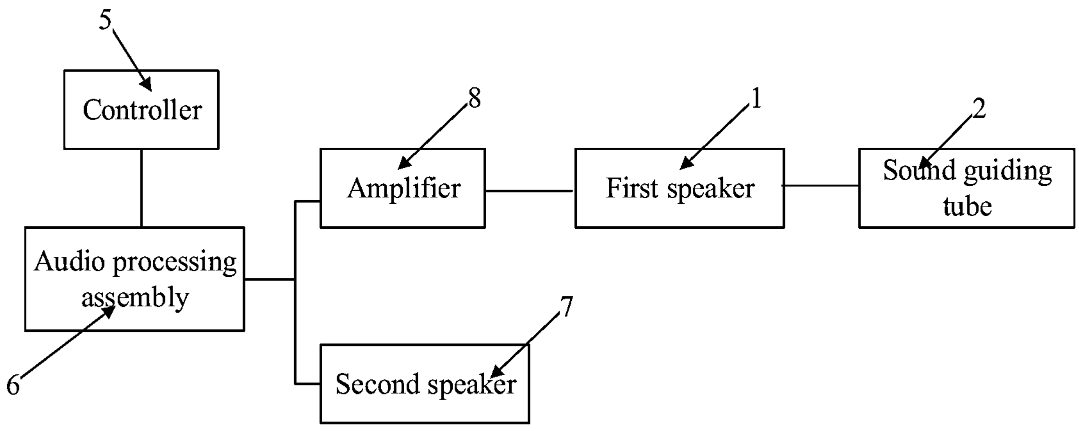
FIG. 4 illustrates a schematic structural diagram of another electronic device according to some embodiments of the present disclosure.

FIG. 4 illustrates a schematic structural diagram of another electronic device according to some embodiments of the present disclosure. The electronic device includes a controller 5.

When the electronic device includes a plurality of first speakers 1, the controller 5 can be configured to determine a target first speaker based on parameter information or user information of an audio signal, control the target first speaker to generate a first sound wave, and emit a sound signal based on the sound guiding component 2 connected to the target first speaker.

In some embodiments, the electronic device includes the controller 5. When the electronic device includes the plurality of first speakers 1, and the parameters of the sound guiding components 2 corresponding to the plurality of first speakers 1 are different, the controller 5 can be configured to determine the parameter information of the plurality of first speakers 1, the parameter information of the corresponding sound guiding components 2, and a first speaker 1 matching the parameter information of the audio signal as the target speaker. The controller 5 can be configured to control the target first speaker to generate the first sound wave based on the audio signal. Thus, the sound guiding component 2 correspondingly connected to the target first speaker can emit the sound signal based on the first sound wave. For example, the low frequency range of the audio signal can be analyzed, a target sound guiding component 2 matching the low frequency range of the audio signal can be selected. In addition, the controller 5 can be further configured to determine the target speaker based on the user information. That is, when the user is at a certain position, based on the position information, the first speaker matching the position information can be determined as the target speaker 1 closest to the position of the user. The controller 5 can be further configured to determine the target first speaker based on the parameter information of the audio signal and the position information of the user.

As shown in FIG. 4, the electronic device further includes an audio processing assembly 6.

The audio processing assembly 6 can be configured to transmit the audio signal with a frequency not greater than the cut-off frequency to the first speaker 1 based on the cut-off frequency.

When the power corresponding to the effective amplitude of the audio signal is not greater than the rated power of the first speaker 1, the audio processing assembly 6 can be configured to transmit the audio signal to the first speaker 1.

When the power corresponding to the effective amplitude of the audio signal is greater than the rated power of the first speaker 1, the audio processing assembly 6 can be configured to reduce the effective amplitude of the audio signal to the set amplitude, and then send the audio signal to the first speaker 1.

The power corresponding to the set amplitude can be smaller than or equal to the rated power of the first speaker 1.

As shown in FIG. 4, in the electronic device of embodiments of the present disclosure, the second body includes a second speaker 7 and an audio processing assembly 6. The second speaker 7 can be arranged between the first speaker 1 and the axis. The audio processing assembly 6 can be connected to the first speaker 1 and the second speaker 7. The audio processing assembly 6 can be configured to transmit the audio signal with the frequency smaller than or equal to the cut-off frequency to the first speaker. The audio processing assembly 6 can be configured to transmit the audio signal with the power greater than the cut-off frequency to the second speaker. Before transmitting the audio signal to the first speaker, the audio processing assembly 6 can detect and calculate the power corresponding to the effective amplitude of the audio signal. If the power corresponding to the effective amplitude of the audio signal is not greater than the rated power of the first speaker 1, the audio processing assembly 6 can transmit the audio signal to the first speaker 1 based on a first amplifier 8. When the power corresponding to the effective amplitude of the audio signal is greater than the rated power of the first speaker 1, the audio processing assembly 6 can reduce the effective of the audio signal to the set amplitude, and then transmit the audio signal to the first speaker 1 based on the first amplifier 8. The operation power of the second speaker 7 can be greater than the operation power of the first speaker 1. The power corresponding to the set amplitude can be smaller than or equal to the rated power of the first speaker 1. In a frequency dividing module of the electronic device of embodiments of the present disclosure, the first speaker 1 can be connected to the sound guiding component 2. Thus, when the power corresponding to the instant amplitude of the audio signal is greater than the rated power of the first speaker 1, any sound guiding component 2 connected to the first speaker 1 can emit the sound signal. Through the frequency division signal enhancement technology, the first amplifier 8 can drive the first speaker 1 and the sound guiding component 2 connected correspondingly to the first speaker 1 to respond with the safe instant big signal to further enhance the frequency response capability of the electronic device.

Figure 5:
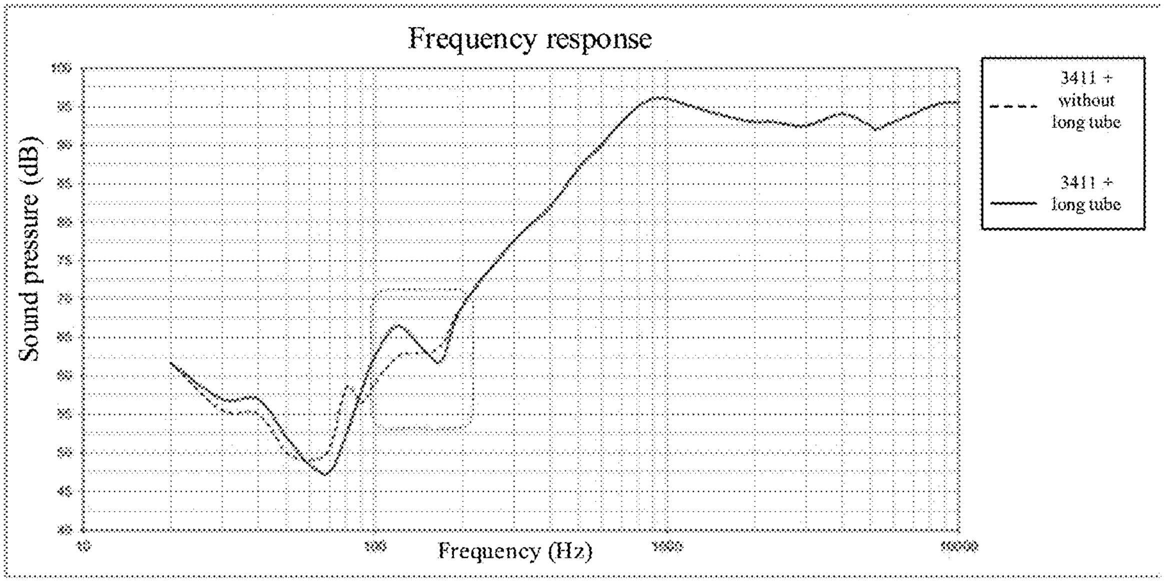
FIG. 5 illustrates a schematic diagram showing a frequency response of a speaker assembly and a reference set of the electronic device according to some embodiments of the present disclosure.
Figure 6:
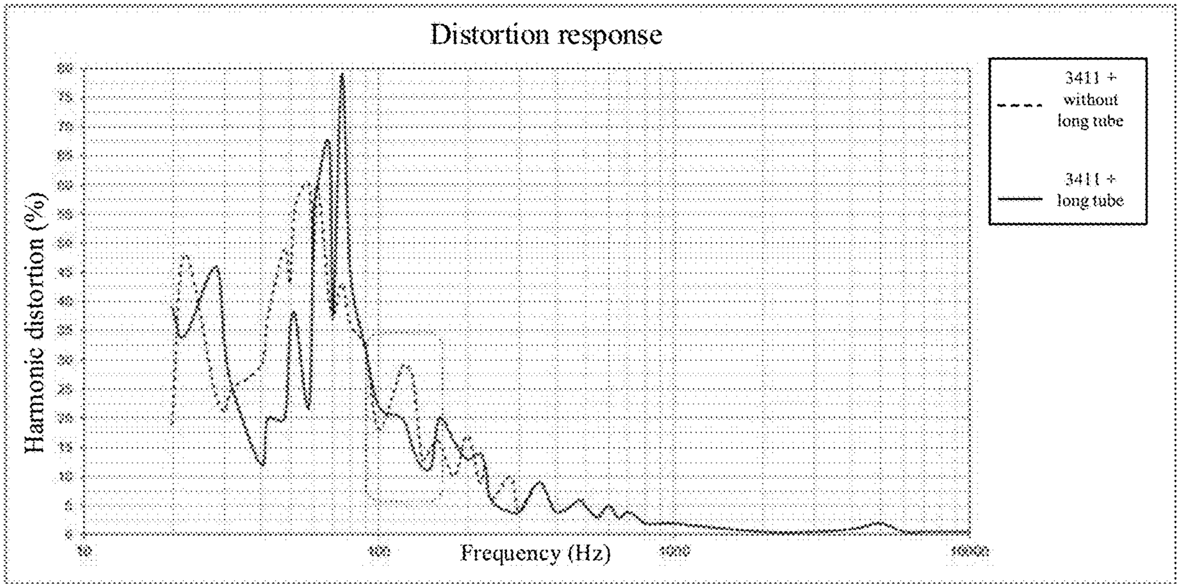
FIG. 6 illustrates a schematic diagram showing a distortion response of a speaker assembly and a reference set of an electronic device according to some embodiments of the present disclosure.

FIG. 5 illustrates a schematic diagram showing a frequency response of a speaker assembly and a reference set of the electronic device according to some embodiments of the present disclosure. FIG. 6 illustrates a schematic diagram showing a distortion response of a speaker assembly and a reference set of an electronic device according to some embodiments of the present disclosure. In some embodiments, the first speakers 1 in FIG. 5 and FIG. 6 are speakers of 3411 type. The first speakers 1 can be connected to the sound guiding components 2. The sound guiding component 2 can be the sound-guiding tube 21. No sound guiding component 2 is set in the reference electronic devices in FIG. 5 and FIG. 6. The reference electronic devices in FIG. 5 and FIG. 6 only include the speakers of the 3411 type. The horizontal axis of FIG. 5 represents frequency, the vertical axis represents sound pressure values. The dashed line in FIG. 5 represents the frequency response curve of the speaker of the reference group that is detected. The solid line represents the frequency response curve of the first speaker 1 of embodiments of the present disclosure that is detected. The frequency range marked by the line frame in FIG. 5 can be the first frequency range that can be enhanced by the first speaker 1. The horizontal axis of FIG. 6 represents the frequency, and the vertical axis represents harmonic distortion. The dashed line of FIG. 6 represents the distortion response curve of the speaker of the reference group that is detected. The solid line represents the distortion response curve of the first speaker 1 that is detected. The frequency range marked in the line frame of FIG. 6 represents the first frequency range that can be enhanced by the sound guiding component 2. As shown in FIG. 5, the sound guiding component 2 is arranged in the electronic device. The sound guiding component 2 is connected to the first speaker 1. Thus, the frequency response capability of the sound wave corresponding to the first frequency range of the first sound wave generated by the first speaker 1 can be significantly improved. As shown in FIG. 6, the electronic device includes the sound guiding component 2. The sound guiding component 2 can be connected to the first speaker 1. Thus, the distortion response capability of the sound wave corresponding to the first frequency range of the first sound wave generated by the first speaker 1 can be significantly reduced.

Based on the above, the present disclosure provides the electronic device. The electronic device can include the sound guiding component 2. The first speaker 1 can be connected to the sound guiding component 2. Thus, the sound wave generated by the first speaker 1 can be formed into the sound signal and output to the user end by the sound guiding component 2 to effectively improve the frequency response capability of the first speaker 1.

In the present specification, embodiments are described in a progressive manner, in a parallel manner, or in a combination of the progressive manner and parallel manner. Each embodiment focuses on the differences from other embodiments. The same or similar parts among the various embodiments can be referred to each other.

In the description of the present disclosure, the drawings and the description of the embodiments are illustrative and not restrictive. The same reference numerals throughout the specification indicate the same structure. Additionally, to facilitate understanding and description, the drawings may exaggerate the thicknesses of some layers, films, panels, regions, etc. When an element such as a layer, film, region, or substrate is referred to as being "on" another element, the element can be directly on the other element or an intervening element may exist in between. Moreover, "on" refers to positioning the element above or below the other element but does not necessarily mean directly positioning above the other element based on the direction of gravity.

The orientation or positional relationships indicated by the terms "up," "down," "top," "bottom," "inside," "outside," etc. can be the orientation or positional relationship shown in the drawings. The terms can be merely used to facilitate and simplify the description of the present disclosure, not indicating or implying that the device or element referred to must have a specific orientation, be constructed, and operate in a specific orientation. Thus, the terms cannot be considered as limiting the present disclosure. When one assembly is described as being "connected" to another assembly, the assembly can be directly connected to the other assembly or through an intervening assembly.

In the present specification, relational terms such as first and second are merely used to distinguish one entity or operation from another entity or operation, and do not necessarily require or imply any actual relationship or order between these entities or operations. Furthermore, the terms "comprising," "including," or any other variants are intended to encompass non-exclusive inclusions so that an article or device that includes a series of elements does not necessarily include only those elements but can include other elements not explicitly listed or inherent to such the article or device. Without further limitations, elements defined by the statement "comprising a . . . " do not exclude the existence of other similar elements in the article or device that includes the above elements.

The description of embodiments of the present disclosure enables those skilled in the art to implement or use the present disclosure. Various modifications to embodiments of the present disclosure can be apparent to those skilled in the art. The generic principles defined herein can be applied to other embodiments without departing from the spirit or scope of the present disclosure. Thus, the present disclosure is not intended to be limited to embodiments of the present disclosure but conforms to the widest scope consistent with the principles and novel features of the present disclosure.

What is claimed is:

1. An electronic device comprising a first speaker and a sound guiding component, wherein:
- the first speaker is in communication with the sound guiding component;
- the sound guiding component is configured to receive a sound wave generated by a vibration of the first speaker, form a sound signal based on the sound wave, and then output the sound signal to a user end to improve a frequency response capability of the first speaker;
- the vibration of the first speaker forms a first sound wave and a second sound wave;
- a phase of the first sound wave is opposite to a phase of the second sound wave; and
- the sound guiding component is configured to receive the first sound wave generated by the first speaker and output the sound signal with the same phase as the second sound wave.

2. The electronic device according to claim 1, further comprising:
- a chamber body including a first opening and a second opening;
- wherein:
  - the sound guiding component includes a first end and a second end;
  - the first speaker is in communication with the chamber body based on the first opening;
  - the first end is in communication with the chamber body based on the second opening and is configured to receive the sound wave generated by the vibration of the first speaker; and
  - the second end is configured to output the sound signal.

3. The electronic device according to claim 2, further comprising:
- a first housing including a sound output hole configured to transmit the sound signal to the user end;
- wherein the position of the sound output hole at the first housing corresponds to a position of the second end in an extension direction of the sound guiding component.

4. The electronic device according to claim 1, wherein the sound guiding component includes:
- a sound-guiding tube including:
  - a plurality of first tubes; and
  - a plurality of bending members, a bending member being configured to connect two neighboring first tubes.

5. The electronic device according to claim 1, wherein:
- improving the frequency response capability of the first speaker includes at least one of:
  - enlarging, by the sound guiding component, a response frequency range of the first speaker; and/or
  - improving, by the sound guiding component, a signal strength of the first speaker.

6. The electronic device according to claim 5, wherein:
- the sound guiding component is configured to increase the strength of a sound wave corresponding to a first frequency range; and
- a length of the sound guiding component is positively correlated with the first frequency range, and/or the length of the sound guiding component is negatively correlated with the strength of the sound wave corresponding to the first frequency range improved by the sound guiding component.

7. The electronic device according to claim 6, wherein in response to the electronic device including the plurality of first speakers, at least one first speaker includes a corresponding sound guiding component.

8. The electronic device according to claim 6, wherein:
- in response to the electronic device including the plurality of first speakers, the plurality of first speakers are connected to the plurality of sound guiding components in a one-to-one correspondence; and
- in response to parameters of the plurality of sound guiding components connected to the plurality of first speakers in the one-to-one correspondence being different, the plurality of sound guiding components have corresponding first frequency ranges, respectively.

9. The electronic device according to claim 8, further comprising a controller configured to, in response to the electronic device including the plurality of first speakers:
- determine a target first speaker based on parameter information and/or user information of an audio signal;
- control the target first speaker to generate the first sound wave; and
- emit the sound signal based on the sound guiding component connected to the target first speaker.

10. The electronic device according to claim 1, further comprising an audio processing assembly configured to:
- send an audio signal with a frequency not greater than a cutoff frequency to the first speaker based on the cutoff frequency;
- in response to a power corresponding to an effective amplitude of the audio signal being not greater than a rated power of the first speaker, send the audio signal to the first speaker; and
- in response to the power corresponding to the effective amplitude of the audio signal being greater than the rated power of the first speaker, reduce the effective amplitude of the audio signal to a set amplitude and then send the audio signal to the first speaker;
- wherein, a power corresponding to the set amplitude is less than or equal to the rated power of the first speaker.

11. An electronic device comprising a first speaker and a sound guiding component, wherein:

the first speaker is in communication with the sound guiding component;

the sound guiding component is configured to receive a sound wave generated by a vibration of the first speaker, form a sound signal based on the sound wave, and then output the sound signal to a user end to improve a frequency response capability of the first speaker;

the vibration of the first speaker forms a first sound wave and a second sound wave;

a phase of the first sound wave is opposite to a phase of the second sound wave;

the sound guiding component is configured to receive the first sound wave generated by the first speaker and output the sound signal with the same phase as the second sound wave; and improving the frequency response capability of the first speaker includes at least one of:

enlarging, by the sound guiding component, a response frequency range of the first speaker; and/or improving, by the sound guiding component, a signal strength of the first speaker.

* * * * *